United States Patent [19]

Möller

[11] Patent Number: 4,669,948
[45] Date of Patent: Jun. 2, 1987

[54] APPARATUS HAVING A LIFTABLE ROTARY TABLE

[75] Inventor: Reinfried Möller, Weinheim, Fed. Rep. of Germany

[73] Assignee: EXPERT Maschinenbau GmbH, Lorsch, Fed. Rep. of Germany

[21] Appl. No.: 680,576

[22] Filed: Dec. 11, 1984

[30] Foreign Application Priority Data
Dec. 12, 1983 [DE] Fed. Rep. of Germany ....... 3344805

[51] Int. Cl.⁴ .............................................. B66C 23/58
[52] U.S. Cl. .................................. 414/744 R; 414/590
[58] Field of Search ............... 414/744 R, 744 C, 222, 414/225, 226, 589, 590; 74/57; 198/470.1–472.1, 474.1

[56] References Cited

U.S. PATENT DOCUMENTS

| 3,241,380 | 3/1966 | Howing | 414/744 R X |
| 4,027,767 | 6/1977 | Gluck | 414/744 R X |
| 4,293,268 | 10/1981 | Mink | 414/744 A X |
| 4,492,512 | 1/1985 | Mink | 414/735 X |

Primary Examiner—Leslie J. Paperner
Assistant Examiner—Donald W. Underwood

[57] ABSTRACT

A lifting and swiveling table mechanism having a swiveling table with a table plate rotated by a stepping drive. The lifting mechanism has a lift slide movably guided up and down in vertical direction and placed co-rotationally on the table plate, with which an indexing slide mounted non-rotatably on a rigid part of the swiveling table is in driving association in the lift direction. The indexing slide has at least one indexing pin projecting at right angles to the lift direction and engaging an indexing groove in the circumferential surface of a vertically disposed cylinder which can be driven in rotation.

12 Claims, 3 Drawing Figures

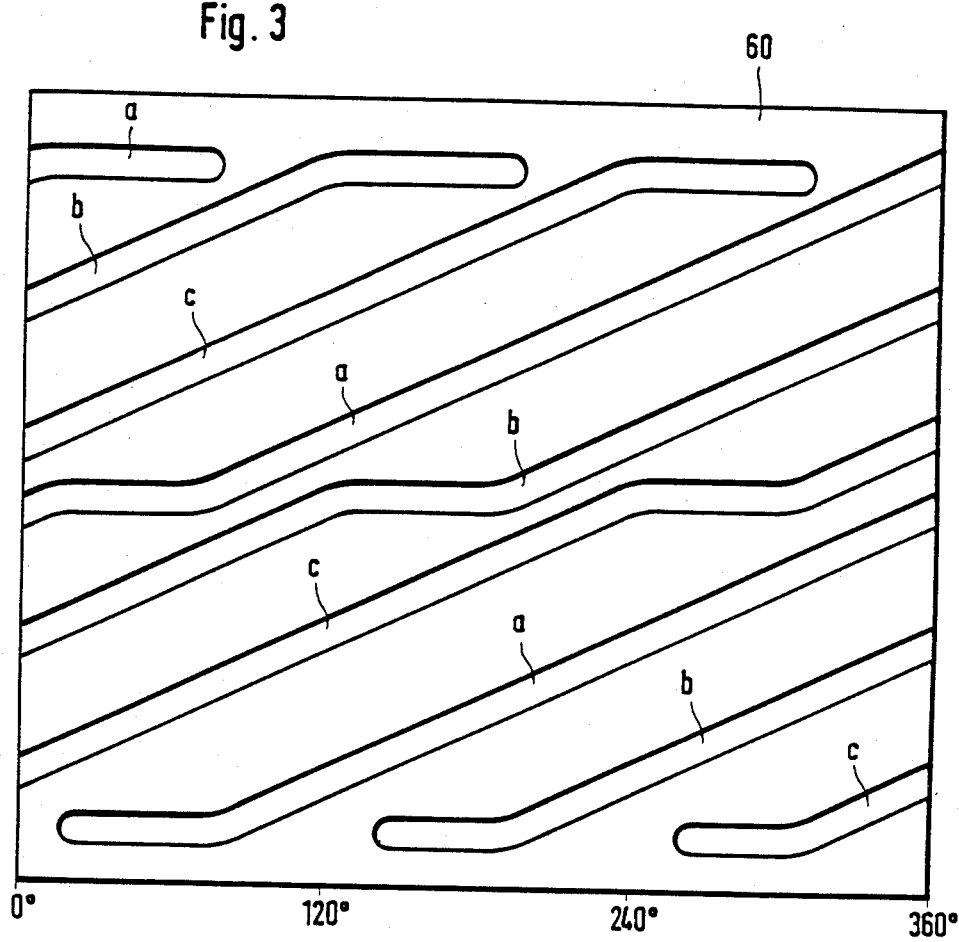

APPARATUS HAVING A LIFTABLE ROTARY TABLE

The invention relates to a lifting and swiveling table mechanism having a swiveling table with a table plate which can be rotated by a stepping drive according to a given law of motion and on which a lift mechanism is constructed.

Swiveling tables having a table plate which can be driven cyclically by given angular amounts by a stepping drive are known, and serve, for example, in production lines for the cyclical transfer of workpieces to a position for pickup, smooth transfer to one (or more) precisely angularly offset working positions, and finally for forwarding to an position at which the workpieces are picked up again and forwarded. Since the table plate is moving in a horizontal plane, these positions must all lie in a single plane. If workpieces are to be carried from one position to positions which are not only at different angles but also at different levels, a likewise smooth lifting movement with a precise positioning at different levels must be added to the cyclic rotation of the table plate.

The invention is therefore addressed to the problem of creating a lifting and swiveling table mechanism which will make it possible to perform such superimposed cyclical lifting and swiveling movements with the necessary accuracy.

This problem is solved in accordance with the invention, in a mechanism of the kind mentioned above, as follows: the lifting mechanism has a lift slide which is placed for co-rotation on the rotationally drivable table plate and which is guided for upward and downward movement in the vertical direction, and with which an indexing slide guided for upward and downward movement in the vertical direction is in a driving relationship in the lift direction; the indexing slide has at least one indexing pin projecting at right angles to the lift direction and engaging an indexing groove made in the circumferential surface of a vertically disposed, rotationally drivable cylinder. By designing the lift drive as a stepping drive having a characteristic of motion that is derived from the course of a circumferential groove in a cylinder, the lift end positions are precisely reachable in accordance with the course of the circumferential groove under selectable velocity and acceleration conditions.

The lift slide is best guided on a lift frame which is formed by a number of vertical columns fastened at uniform angular intervals from one another on the rotationally drivable table plate, and whose free ends remote from the table plate can also be joined rigidly to one another by a horizontal cross plate for the purpose of making the lift frame as rigid as possible.

For example, an embodiment is advantageous in which the lift frame has three guiding columns.

The lift slide in turn then has guiding sleeves which are disposed for longitudinal displacement one on each guiding column, and which are fastened to the periphery of a horizontal support ring which thus assures that the guiding sleeves can be displaced on the guiding columns only in a simultaneous and synchronous manner.

Radially projecting arms can then be provided on the support ring and/or on the guiding sleeves, and on the extremities of the arms there are provided the means for accommodating the workpieces to be brought from position to position. Instead of the individual arms, a revolving, circular transport disk can be provided, on which the accommodating means or holders for the workpieces are then disposed.

In a preferred embodiment of the invention, the indexing slide is guided on an indexing support frame formed by at least three columns set at equal angular intervals from one another and joined rigidly together at both ends by horizontal cross plates, and disposed nonrotatably centrally inside of the lift frame.

Preferably the indexing slide has three guiding slides mounted for longitudinal displacement on the associated frame columns, each guiding slide having one radially inwardly projecting indexing pin, while a cylinder is disposed centrally within the index support frame and has three indexing grooves of the same pitch characteristic set at 120° from one another which are engaged by the index pins. The use of a three-course cylinder thus makes possible an absolutely synchronous and simultaneous driving of the three guiding slides forming the indexing slide by means of only one centrally disposed cylinder. An additional rigid joining of the guiding slides—say by an annular component corresponding to the support ring of the lift slide—is therefore unnecessary.

The coupling of the guiding slides to the lift slides is accomplished by the fact that the support ring of the lift slide has the cross-sectional shape of a U tipped at 90°, whose web is fastened to the guiding sleeves, while the legs of the U are pointed radially inwardly from the web, and that a lift pin projects from each guiding slide between the limbs of the U of the support ring. While the lift pins of the guiding slides positively drive the support ring, and thus also the lift slide, there is no torsional coupling of the lift slide to the indexing slide.

On each of the free ends of the lift pins it is desirable to journal a wheel whose diameter is substantially equal to the clear distance between the inside faces of the limbs of the U of the support ring.

To make possible the rigid disposition of the indexing support frame above the rotationally drivable table plate of the swiveling table, a central through-opening can be provided in the rotationally drivable table plate to accommodate a base piece rigidly joined to the frame of the swiveling table and projecting from the table-plate-confronting bottom of the lower cross plate of the indexing support frame.

The cylinder controlling the lifting movement is best journaled, by means of pivots projecting from their end surfaces, in bearings in the upper and lower cross plate of the indexing support frame, and then a drive motor is disposed on the top of the upper cross plate remote from the swiveling table, and its drive shaft is coupled directly, or indirectly through an interposed reducing gear, to the pivot of the cylinder that is journaled in the upper cross plate.

The invention is further explained in the following description of an embodiment in conjunction with the drawing, wherein:

FIG. 3 is a development of the circumference of the cylinder of the vertical drive of the lifting and swiveling table system.

Figure 1:
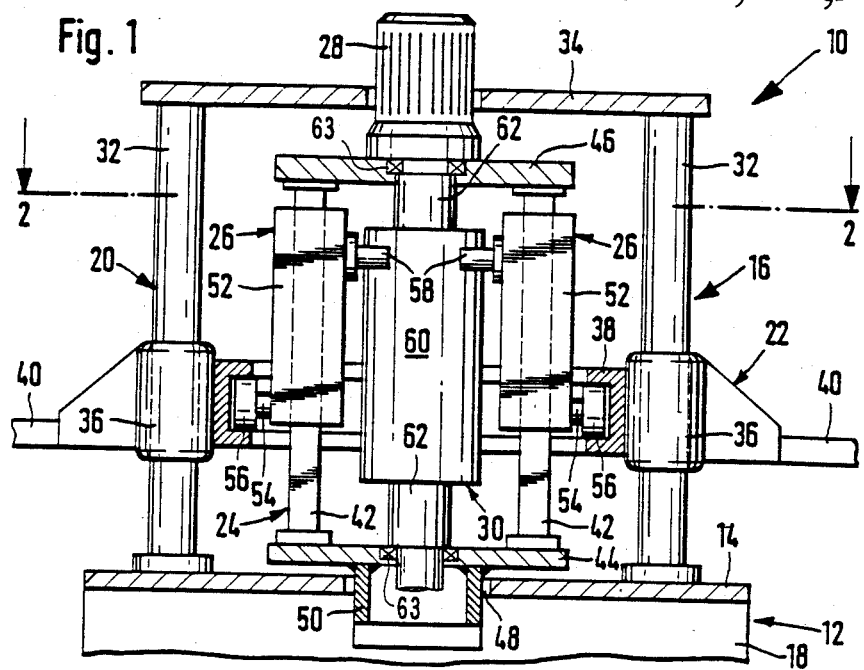
FIG. 1 is a diagrammatic representation of a lifting and swiveling table system in cross section along line 1—1 of FIG. 2.
Figure 2:
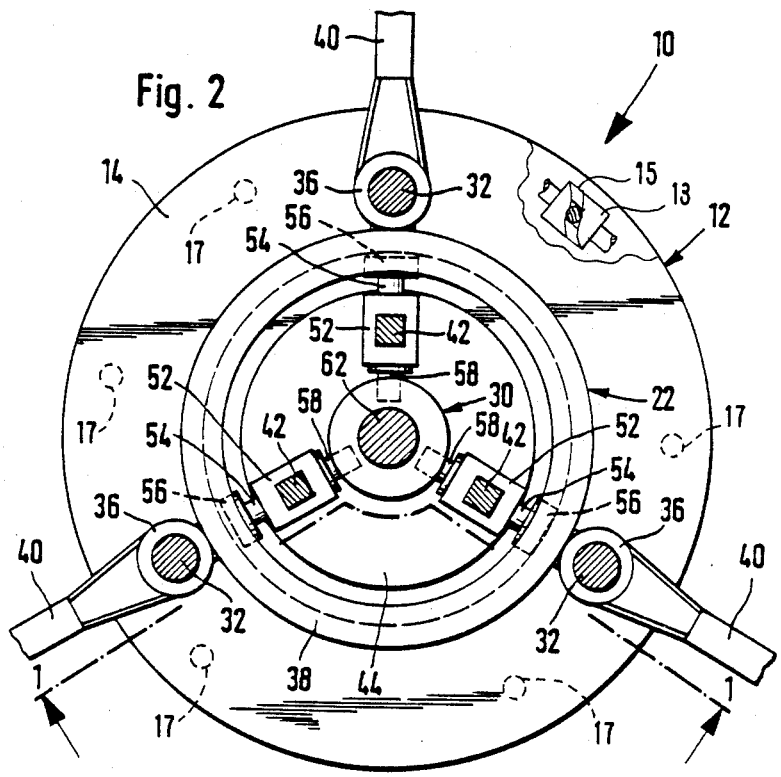
FIG. 2 is a sectional view of the lifting and swiveling table system as seen in the direction of the arrows 2—2 in FIG. 1.

In FIGS. 1 and 2 there is shown a lifting and swiveling table system designated as a whole by the number 10, which is composed of a swiveling table 12 which can be rotated cyclically by a given angular amount by a stepping drive, and of a lift mechanism 16 placed on a swiveling table plate 14 of table 12. Swiveling tables having stepping drives are known (for instance from U.S. Pat. No. 2,852,960), so that in the drawings only the table plate 14 is represented, which is mounted rotatably on a stationary swiveling table frame 18 which is indicated only diagrammatically. The table is driven by a cylinder 13 having a circumferential groove 15 engaged by pins 17 on the bottomside of table plate 14.

The lift mechanism 16 is composed of three component groups, namely: a lift frame 20 disposed co-rotationally on the table plate 14, which in turn is rotationally drivable, this lift frame bearing a vertically displaceable slide 22; an indexing frame 24 which is fixed to the swiveling table frame 18 inside of the lift frame 20 and bears an indexing slide 26 also displaceable vertically, and a cylinder 30 which is mounted centrally, with a vertical axis of rotation, within the indexing frame 24, and which can be rotated by a drive motor 28 mounted on the indexing frame 24, independently of the drive of the swiveling table 12.

The lift frame 20 consists in the present case of three vertical guide columns 32 of circular cross section bolted (or otherwise fastened) at equal angular intervals on the same diameter on the upper side of the table plate; these vertical guide columns 32 are joined rigidly together by a cross plate 34 at their upper free end surfaces. The lift slide 22 is formed by three guide sleeves 36 which are guided for vertical displacement each on one of the guiding columns 32, and which are rigidly fastened, e.g., by welding, to the outside surface of a horizontal ring 38, so that they are displaceable on the guide columns 32 only together with the ring 38. In the present case, an arm 40 projecting horizontally and radially outwardly from each guide sleeve 36 is used as the workpiece holding means, assuming that the plate 14 of the swiveling table 12 covers an angle of 120° upon each step of rotation. If the stepping drive of the swiveling table 12 is designed for smaller angular steps of rotation, e.g., of 90° each or 72° each, the lift frame can be composed either of four or five guide columns disposed at equal angular intervals, in which case the lift slide is then also guided by either four or five guiding sleeves on the guide columns and one arm is attached to each guiding sleeve, or the arms 40 are placed on the appropriately stiffly constructed carrier ring 38, in a number and at positions corresponding to the rotational angle of the swiveling table. Instead of individual arms, an annularly closed horizontal carrier plate can, of course, be fastened to the guiding sleeves 36 and/or to the carrier ring 38, or placed on the arms 40.

The indexing frame 24 is formed by three columns 42 disposed at equal angular intervals within the lift frame 20, the bottom and top surfaces of the columns 42 again being joined rigidly together by horizontal cross plates 44 and 46, respectively. A base piece 50 projecting centrally from the bottom of the lower cross plate 44 and through a central opening 48 in the table plate 14 is rigidly anchored in the swiveling table frame 18. On each of the columns 42 of square cross section a guiding slide 52 is longitudinally displaceable and held against rotation due to its square cross section. Of the outside surfaces of the guiding slide 52 facing the supporting ring 38 there projects from each a lift pin 54 on which a roller 56 is rotatably mounted. The supporting ring 38 has the cross-sectional shape of a U rotated 90°, from whose upright web the two limbs of the U point radially inwardly, the distance between the inner faces of the limbs being made approximately equal to the diameter of the rollers 56. The rollers whose circumferential surfaces are engaged between the limbs of the U thus make it possible for the lift slide 22 to be turned relative to the indexing slide 26 formed by the three guiding slides 52, while the lifting and indexing slides are positively coupled to one another in the direction of the vertical lifting movement. The guiding slides 52 are displaceable vertically only simultaneously and synchronously together with the lift slides 22, due to the engagement of the roller 56 with the supporting ring 38, i.e., no component corresponding to the supporting ring 38 of the lift slide 22 is needed to rigidly join the guiding slides 52 to form an integral indexing slide.

Each guiding slide 52 is furthermore provided with an indexing pin 58 projecting horizontally and radially inwardly, whose free end projects into an indexing groove a, b, or c (FIG. 3) in the circumferential surface 60 of the cylinder 30, the cylinder being provided with three indexing grooves of the same pitch characteristic, each offset 120° from the other, i.e., each indexing pin 58 engages a separate indexing groove.

The cylinder 30 is rotatably mounted in the top and bottom cross plates 46 and 44 of the index holding frame 24 by pivots 62 projecting axially from its end surfaces and journalled in bearings 63 in cross plates 44 and 46. The drive motor 28 flange-mounted on top of the upper cross plate 46 is coupled to the pivot 62 carried in the upper cross plate, so that the cylinder 30 rotates when the motor 28 is running. The indexing pins 58 are then displaced according to the pitch of the indexing grooves a, b and c, and thus the guiding slides 52, which together also form the indexing slide 26, are also displaced, and in turn carry the lift slide 22 in the vertical direction. It is, however, easily possible for the lifting movement to be combined with the simultaneous driving of the table plate 14 of the swiveling table 12.

Thus, the velocity and acceleration of the vertical movement of the lift slide 22 is ultimately determined by the course of the indexing grooves a, b and c of the cylinder 30. FIG. 3 is a diagrammatic representation of a development of the circumferential surface 60 of the cylinder 30, in which the indexing grooves of identical configuration, offset from one another circumferentially by 120°, have upper and lower sections, plus a section between the latter, in which they run circumferentially. When the cylinder revolves, as long as the indexing pins 58 are in these circumferential sections, it is evident that there will be no change in the height of the guiding slides 52 and thus of the lift slide 22. Not until the pins 58 pass over into the sloping sections of the indexing grooves does a change take place in the height of the indexing pins, which is converted by the guiding slides 52 to the desired lifting movement of the lift slide 22. The configuration of the indexing grooves a, b and c, diagrammatically represented in FIG. 3, will result, for example, due to the circumferential section of the index groove at the center of the height of the cylinder, in a two-stage lifting movement of the lift slide with a stand-still position at half the height.

I claim:

1. A lifting and swiveling table mechanism, comprising: a swiveling table having a stationary part and also having a rotatable table plate, a stepping drive for rotating the table plate, a lift mechanism having a lift slide, means for movably guiding said lift slide in substantially vertical direction and placing said lift slide on said rotatable table plate for co-rotation therewith, an indexing slide mounted non-rotatably on the stationary part of the swiveling table, means for guiding said indexing slide vertically, means positively coupling said lift slide and said indexing slide to one another for movement in vertical direction, a vertically disposed cylinder having a circumferential surface with at least one indexing groove, said indexing slide having at least one indexing pin projecting at right angles to the vertical direction and engaging said at least one indexing groove, and means independent of said stepping drive, for rotating said cylinder.

2. A lifting and swiveling table mechanism according to claim 1, wherein said means for guiding said lift slide is a lift frame formed by a plurality of vertical columns offset from one another at uniform angular intervals on said rotatable table plate.

3. A lifting and swiveling table mechanism according to claim 2, comprising a horizontal cross plate rigidly joining ends of the columns remote from said table plate.

4. A lifting and swiveling table mechanism according to claim 2, wherein said lift frame has three columns.

5. A lifting and swiveling table mechanism according to claim 2, wherein said means positively coupling said lift slide and said indexing slide comprises a plurality of guiding sleeves on said lift slide, said guiding sleeves being respectively disposed for longitudinal displacement on said columns, said guiding sleeves being fastened to the periphery of a horizontally mounted supporting ring.

6. A lifting and swiveling table mechanism according to claim 5, comprising radially projecting arms on at least one of said supporting ring and guiding sleeves.

7. A lifting and swiveling table mechanism according to claim 2, comprising: at least three support columns, each having first and second ends and forming an indexing support frame for guiding said indexing slide, an upper and a lower, horizontal cross plate, respectively rigidly joining said first and second ends, said support columns being set apart from each other at uniform angular intervals, said support frame being disposed nonrotatably centrally inside said lift frame.

8. A lifting and swiveling table mechanism according to claim 7, wherein said indexing slide has three guiding slides respectively mounted on said three support columns, each guiding slide having an indexing pin projecting radially inwardly, said cylinder being disposed centrally within said support frame and having three index grooves of equal pitch characteristic offset 120° from one another, said indexing pins respectively engaging said grooves.

9. A lifting and swiveling table mechanism according to claim 5, wherein said supporting ring has the cross-sectional shape of a U tipped at 90°, with a web fastened to the guiding sleeves, and with U-limbs pointing radially inwardly from the web, a plurality of lift pins projecting from said guiding slide and extending between the U-limbs.

10. A lifting and swiveling table mechanism according to claim 9, comprising one roller each rotatably mounted on free ends of the lift pins, each roller having a diameter substantially equal to the clear distance between inside faces of the U-limbs of the supporting ring.

11. A lifting and swiveling table mechanism according to claim 10, wherein said table plate has a central opening, said opening accommodating a base piece rigidly joined to the table frame.

12. A lifting and swiveling table mechanism according to claim 7, comprising upper and lower pivots projecting from said cylinder and journalled in bearings in said upper and lower cross plate, respectively, a drive motor disposed on said upper cross plate remote from the swiveling table and having a drive shaft coupled to said upper pivot.

* * * * *